US008548705B2

(12) United States Patent
Eich et al.

(10) Patent No.: US 8,548,705 B2
(45) Date of Patent: Oct. 1, 2013

(54) METHOD FOR CONTROLLING AN AUTOMATED CLUTCH

(71) Applicant: Schaeffler Technologies AG & Co. KG, Herzogenaurach (DE)

(72) Inventors: Juergen Eich, Buehl (DE); Markus Baehr, Buehl (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 13/632,278

(22) Filed: Oct. 1, 2012

(65) Prior Publication Data

US 2013/0020169 A1  Jan. 24, 2013

Related U.S. Application Data

(63) Continuation of application No. PCT/DE2011/000297, filed on Mar. 21, 2011.

(30) Foreign Application Priority Data

Apr. 8, 2010  (DE) .................. 10 2010 014 202

(51) Int. Cl.
G06F 19/00 (2011.01)
(52) U.S. Cl.
USPC ............ 701/68; 180/6.48; 180/242; 180/247; 180/307; 180/308; 60/426; 60/431; 60/443; 60/444; 60/445; 303/11; 303/113.3; 303/116.2; 303/901; 475/75; 475/76; 475/80; 475/81; 475/88; 477/68; 91/473

(58) Field of Classification Search
USPC .................. 701/68; 180/6.48, 242, 247, 307, 180/308; 60/426, 431, 443, 444, 445, 449, 60/484; 303/11, 113.3, 116.2, 901; 475/75, 475/76, 80, 81, 88; 477/68; 91/473
See application file for complete search history.

(56) References Cited

U.S. PATENT DOCUMENTS

| 5,060,776 | A | * | 10/1991 | Skog et al. ................. 192/85.51 |
| 5,275,267 | A | * | 1/1994 | Slicker .......................... 477/176 |
| 5,293,316 | A | * | 3/1994 | Slicker ............................ 701/68 |
| 5,323,870 | A | * | 6/1994 | Parigger et al. ............... 180/197 |
| 6,116,391 | A | * | 9/2000 | Kremmling et al. ......... 192/3.58 |
| 6,375,280 | B1 | * | 4/2002 | Poggenburg et al. ......... 303/146 |
| 6,712,189 | B2 | * | 3/2004 | Hirt .............................. 192/84.6 |
| 8,113,309 | B2 | * | 2/2012 | Allgaier .................. 180/65.265 |
| 8,172,059 | B2 | * | 5/2012 | Reuschel et al. ............ 192/85.55 |
| 8,328,684 | B2 | * | 12/2012 | Klump .............................. 477/54 |
| 8,335,624 | B2 | * | 12/2012 | Suzuki et al. .................... 701/68 |
| 2006/0293147 | A1 | | 12/2006 | Adams et al. |
| 2013/0032444 | A1 | * | 2/2013 | Baehr et al. ................ 192/85.63 |

FOREIGN PATENT DOCUMENTS

| DE | 10127765 | 1/2002 |
| DE | 10213946 | 10/2002 |
| DE | 102006014141 | 10/2007 |
| DE | 102009009145 | 9/2009 |
| EP | 2105626 | 9/2009 |

* cited by examiner

Primary Examiner — McDieunel Marc
(74) Attorney, Agent, or Firm — Simpson & Simpson, PLLC

(57) ABSTRACT

A method for controlling an automated clutch, which comprises a hydraulic clutch actuating system having a hydrostatic actuator, the pressure of which is detected. The method includes using the pressure of the hydrostatic actuator to adapt the characteristic curve of the clutch.

12 Claims, 1 Drawing Sheet

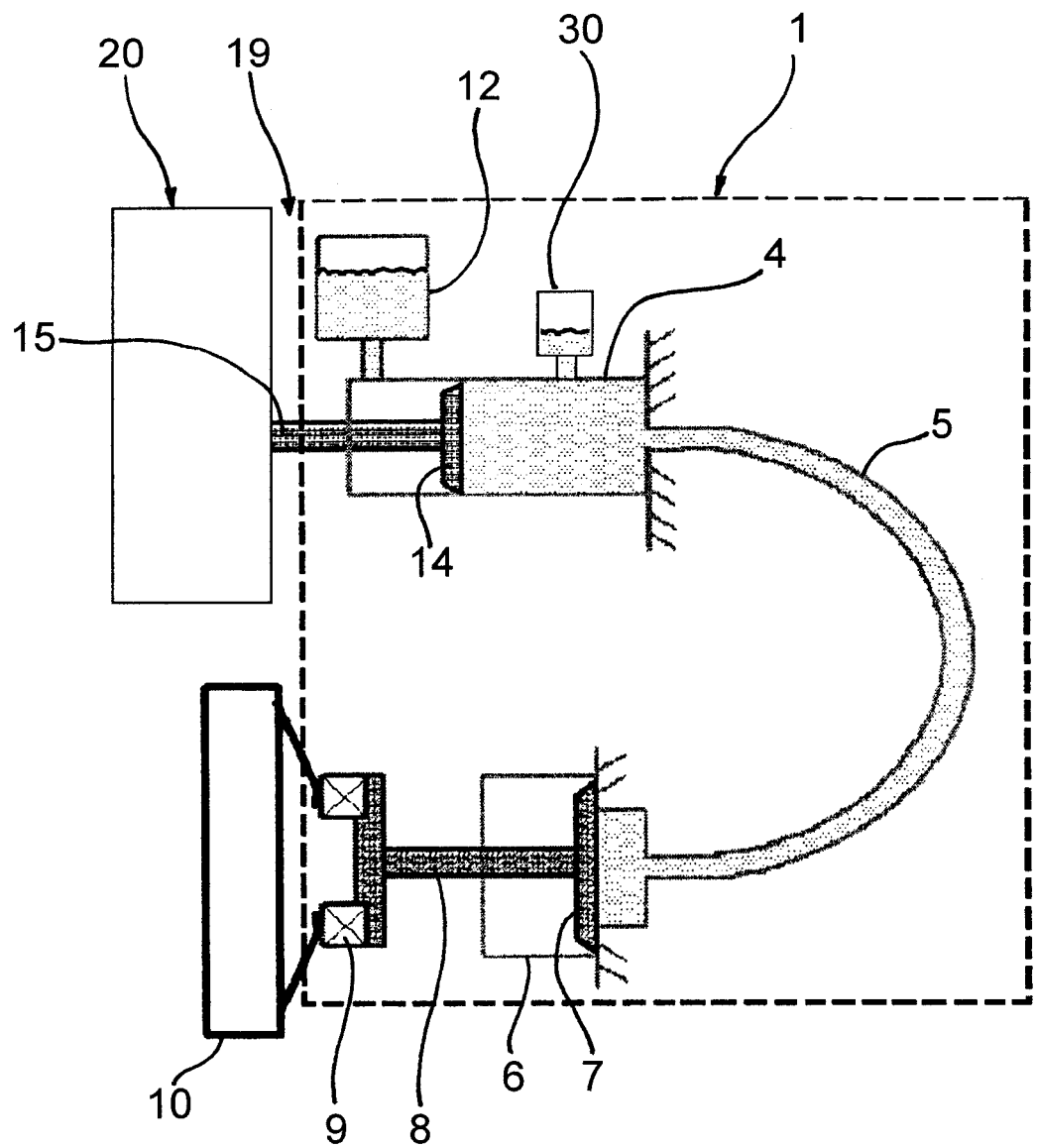

METHOD FOR CONTROLLING AN AUTOMATED CLUTCH

CROSS-REFERENCE TO RELATED APPLICATIONS

This application is filed under 35 U.S.C. §120 and §365(c) as a continuation of International Patent Application No. PCT/DE2011/000297, filed Mar. 21, 2011, which application claims priority from German Patent Application No. 10 2010 014 202.6, filed Apr. 8, 2010, which application are incorporated herein by their entirety.

FIELD OF THE INVENTION

The invention relates to a method for controlling an automated clutch, which comprises a hydraulic clutch actuating system having a hydrostatic actuator, the pressure of which is detected.

BACKGROUND OF THE INVENTION

From German patent applications DE 101 27 765 A1 and DE 102 13 946 A1 methods are known for controlling an automated clutch, in which engine torque signals and engine speed signals are used in order to obtain correction values. From the German patent application DE 10 2009 009 145 A1 a clutch system having a hydrostatic clutch disengagement system is known, where deviations of an opening behavior of a connecting aperture are detected by determining the pressure behavior of the clutch disengagement system depending on an actuating speed of a master cylinder piston. The evaluation of the pressure relationships depending on the actuation path of the clutch can be carried out by means of a pressure sensor which is integrated in the clutch disengagement system, for example, in the master or slave cylinder or in the pressure line. The position of the connecting aperture, or the virtual position of a point at which the clutch disengagement system begins to initiate a movement at diaphragm spring tongues at a prescribed speed of the master cylinder piston, can be obtained from a comparison of the position of a touch point of the friction clutch at various actuating speeds of the master cylinder piston. Such a determination can be carried out redundant to the obtained pressure sensor measurements, or alternatively to the latter if no pressure sensor is provided. In this case, the setting of the touch point requires a certain pressure at the slave cylinder so that here too an indirect determination of pressure can be made without a pressure sensor.

BRIEF SUMMARY OF THE INVENTION

The object of the invention is to improve the adaptation of clutch characteristic curves for clutches, in particular for directly actuated dual clutches.

The object is fulfilled by a method for controlling an automated clutch, which comprises a hydraulic clutch actuating system having a hydrostatic actuator, the pressure of which is detected. The pressure of the hydrostatic actuator is used to adapt the characteristic curve of the clutch. The pressure of the hydrostatic actuator is detected, for example, by a pressure sensor on the master cylinder. However, the pressure can also be detected at some other location in the hydraulic link of the clutch actuating system. To actuate clutches, knowledge of the clutch characteristic curve, and in particular of the touch point of the clutch, is of decisive importance so as to achieve a high level of driving comfort of motor vehicles having an automated clutch or automatic shifting transmission. Since the clutch characteristic curve can vary greatly from vehicle to vehicle, as well as over the service life of the same vehicle, various adaptation mechanisms are employed in order to constantly follow the actual behavior of a given clutch with the clutch control system. The use of pressure information for the adaptation of the clutch characteristic curve according to the invention has the advantage that it functions independently of the determination of an engine reference torque in idling phases of the motor vehicle. This enables, in particular, an adaptation of a clutch characteristic curve of automated clutches in connection with hybrid drives or a start/stop functionality.

An exemplary embodiment of the method uses a pressure signal of the hydrostatic actuator to adapt a touch point of the clutch. One of the advantages of this is that the touch point adaptation can take place in a multitude of driving situations, including, in particular, when the combustion engine of the motor vehicle is shut off.

Another exemplary embodiment of the method uses an evaluation of drivetrain dynamics on the basis of torque and/or rotational speed signals to adapt a coefficient of friction. According to an essential aspect of the invention, the touch point adaptation is thereby uncoupled from the coefficient of friction adaptation.

Another preferred exemplary embodiment of the method moves the clutch from a completely disengaged position to an engaged position, in which case the pressure of the hydrostatic actuator is not used to adapt the clutch characteristic curve until the pressure rises significantly. When engaging the clutch, a so-called air gap must first be surmounted; i.e., a working zone without appreciable contact between drive-side and output-side elements of the clutch. A very low pressure level can be expected in this zone, with little dependency on the travel of the actuator. As soon as the air gap has been surmounted and the drive-side and output-side elements of the clutch are pressed against each other, the pressure in the hydrostatic or hydraulic link of the clutch actuator increases significantly. The position of the beginning pressure increase correlates with the touch point of the clutch.

Another exemplary embodiment of the method, when no gear is engaged, actuates the hydrostatic actuator with a slow position ramp, in order to obtain the position of a significant pressure increase. In this case, the course of the pressure signal is tested without any influence on the acceleration of the vehicle. The evaluation can also be conducted during regular operation, based on a model.

Another exemplary embodiment of the method actuates the clutch directly by means of the hydrostatic actuator and a master cylinder and a slave cylinder. Directly means that the hydrostatic pressure of the actuator acts on the clutch without interposing lever mechanisms. In connection with directly actuated clutches, there is a relatively direct relationship between the master cylinder pressure, the engaging force of the clutch and the clutch torque.

Another exemplary embodiment of the method correlates the coefficient of friction of the clutch with the pressure signal of the hydrostatic actuator. If the clutch is engaged beyond the touch point, the clamping force within the clutch, and thus the torque which it can transmit, is increased corresponding to the elasticity in the clutch and the actuating system. Specifically in the case of directly actuated clutches having few friction points, the clamping force of the clutch can be correlated well with the pressure signal in the hydrostatic link. As a consequence of this, the transmissible clutch torque is also closely tied to the pressure signal, and can be described approximately by a proportional factor, which is also referred to as the coefficient of friction. This coefficient of friction can be adapted by observing the drivetrain dynamics, in particular on the basis of engine torque and engine speed, in order to take account, for example, of changes based on temperature, aging or soiling effects in the control system.

Another exemplary embodiment of the method moves the clutch from a completely disengaged position to an engaged position. The position of the clutch touch point is concluded from the beginning of a significant increase in the pressure signal.

Another exemplary embodiment of the method obtains the clutch touch point during normal driving operation from the course of the pressure signal.

Another exemplary embodiment of the method obtains the coefficient of friction of the clutch by correlating the pressure signal of the hydrostatic actuator with a clutch torque obtained from the engine torque and engine speed.

Another exemplary embodiment of the method uses the pressure signal of the hydrostatic actuator directly as an additional control variable. The pressure signal can be reduced, for example, in order to reduce a crosstalk effect of the clutch.

Another exemplary embodiment of the method uses the pressure signal of the hydrostatic actuator indirectly by a pressure-signal-based adaptation of form factors and/or crosstalk parameters. Various characteristic curve patterns of clutches can be better approximated with the help of the form factors. Crosstalk models with crosstalk parameters can be used to compensate for the mutual influence of the torque moments in dual clutches when actuating both partial clutches simultaneously.

BRIEF DESCRIPTION OF THE SEVERAL VIEWS OF THE DRAWING

Additional advantages, features and details of the invention can be seen from the following description, in which various exemplary embodiments are described in detail with reference to the drawing.

FIG. 1 depicts in simplified form a clutch actuating system for actuating an automated friction clutch.

DETAILED DESCRIPTION OF THE INVENTION

FIG. 1 depicts in simplified form a clutch actuating system 1 for an automated clutch, in particular an automated dual clutch. The clutch actuating system 1 is assigned to a friction clutch 10 designed as a dual clutch in a drivetrain of a motor vehicle, and includes a master cylinder 4, which is connected to a slave cylinder 6 via a hydraulic line 5, also referred to as a pressure line. Movable back and forth in the slave cylinder 6 is a slave piston 7, which actuates a friction clutch 10 designed as a dual clutch, by means of actuating component 8 and with the inclusion of bearing 9.

The master cylinder 4 is connected to an equalizing container 12 through a connecting aperture. A master piston 14 is movable back and forth in the master cylinder 4. A piston rod 15, which is movable linearly in the longitudinal direction together with the master piston 14, extends from the master piston 14.

The master piston 14 and the piston rod 15 are parts of an actuator 19, which is coupled with an electric motor positioning drive 20. Using the electric motor positioning drive 20, the actuator 19 carries out longitudinal movements depending on control signals of a control system, which movements are transmitted through the master piston 14 to the hydrostatic or hydraulic link, which includes the master cylinder 4 and the slave cylinder 6.

The hydraulic pressure in the hydraulic or hydrostatic link is detected by means of a pressure sensor 30, which is attached to the master cylinder 4. The pressure sensor 30 supplies a pressure signal, which is also referred to as an actuator pressure signal.

If the clutch actuator 19 is moved from a completely disengaged position in the direction "clutch engaged," the so-called air gap of the clutch 10 must first be surmounted. As soon as the air gap has been surmounted and the drive-side and output-side elements of the clutch 10 are pressed against each other, the pressure in the hydrostatic link of the clutch actuator 19 will increase tremendously. The position of the beginning pressure increase then correlates with the touch point of the clutch 10.

If the clutch 10 is engaged beyond the touch point, the clamping force within the clutch 10, and thus the torque which it can transmit, is increased corresponding to the elasticity in the clutch 10 and the engaging system or actuating system. The transmissible clutch torque is described approximately by a proportional factor, which is also referred to as the coefficient of friction.

The solution according to the invention can be implemented in various control algorithms. For example, with no gear engaged slow position ramps can be used in order to obtain the position of a beginning significant pressure increase from the course of the pressure signal. However, the pressure signal can also be evaluated during normal driving operation for the purpose of adapting the clutch. Along with the named characteristic values, touch point and coefficient of friction, additional parameters can also be taken into account in the control algorithms for the automated clutch system, in order to enable better adaptation of the models within the control system to the individually different real clutches.

REFERENCE LABELS 1 clutch actuating system
4 master cylinder
5 hydraulic line
6 slave cylinder
7 slave piston
8 actuating organ
9 bearing
10 clutch
12 equalizing container
14 master piston
15 piston rod
19 actuator
20 electric motor positioning drive
30 pressure sensor

We claim:

1. A method for controlling an automated clutch (10), which comprises a hydraulic clutch actuating system (1) having a hydrostatic actuator (19), a pressure of which is detected, the method comprising using the pressure of the hydrostatic actuator (19) to adapt a characteristic curve of the clutch.

2. The method according to claim 1, further comprising using a pressure signal of the hydrostatic actuator (19) to adapt a touch point of the clutch (10).

3. The method according to claim 1, further comprising:
   moving the clutch (10) from a completely disengaged position to an engaged position; and
   concluding the position of a clutch touch point from a beginning of a significant increase in a pressure signal.

4. The method according to claim 1, further comprising when no gear is engaged, actuating the hydrostatic actuator

(19) with a slow position ramp, in order to obtain a position of a significant pressure increase.

5. The method according to claim 1, further comprising actuating the clutch (10) directly by means of the hydrostatic actuator (19) and a master cylinder (4) and a slave cylinder (6).

6. The method according to claim 1, further comprising correlating a coefficient of friction of the clutch (10) with a pressure signal of the hydrostatic actuator (19).

7. The method according to claim 1, further comprising obtaining a coefficient of friction of the clutch (10) by correlating a pressure signal of the hydrostatic actuator (19) with a clutch torque obtained from an engine torque and engine speed.

8. The method according to claim 1, further comprising using a pressure signal of the hydrostatic actuator (19) directly as an additional control variable.

9. The method according to claim 1, further comprising using a pressure signal of the hydrostatic actuator (19) indirectly by a pressure-signal-based adaptation of form factors and crosstalk parameters.

10. The method according to claim 1, further comprising using a pressure signal of the hydrostatic actuator (19) indirectly by a pressure-signal-based adaptation of form factors or crosstalk parameters.

11. A method for controlling an automated clutch, which comprises a hydraulic clutch actuating system having a hydrostatic actuator, a pressure of which is detected, the method comprising:
    obtaining a coefficient of friction of the clutch by correlating a pressure signal of the hydrostatic actuator with a clutch torque obtained from an engine torque and engine speed; and,
    using the pressure of the hydrostatic actuator to adapt a characteristic curve of the clutch.

12. A method for controlling an automated clutch, which comprises a hydraulic clutch actuating system having a hydrostatic actuator, a pressure of which is detected, the method comprising:
    using a pressure signal of the hydrostatic actuator indirectly by a pressure-signal-based adaptation of form factors and crosstalk parameters; and,
    using the pressure of the hydrostatic actuator to adapt a characteristic curve of the clutch.

\* \* \* \* \*